United States Patent
Tong et al.

(10) Patent No.: US 11,748,120 B1
(45) Date of Patent: Sep. 5, 2023

(54) SERVER-BASED USER INTERFACE RENDERING

(71) Applicant: Amazon Technologies, Inc., Seattle, WA (US)

(72) Inventors: Kwok Yin Timothy Tong, Renton, WA (US); Todd Sullivan, Bainbridge Island, WA (US); Chirag Jain, San Jose, CA (US); Hans Hoeijmakers, Sunnyvale, CA (US); Ryan Dong, Mountain View, CA (US); Lu Chuan Liu, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/544,112

(22) Filed: Dec. 7, 2021

(51) Int. Cl.
- G06F 9/451 (2018.01)
- G06F 3/0484 (2022.01)
- G06F 9/54 (2006.01)

(52) U.S. Cl.
CPC ............ G06F 9/451 (2018.02); G06F 3/0484 (2013.01); G06F 9/542 (2013.01)

(58) Field of Classification Search
CPC ......... G06F 9/451; G06F 3/0484; G06F 9/542
See application file for complete search history.

(56) References Cited

U.S. PATENT DOCUMENTS

| | | | |
|---|---|---|---|
| 10,990,255 B1 * | 4/2021 | Tarleton | G06F 3/04842 |
| 2010/0248788 A1 * | 9/2010 | Yook | G06F 3/04886 455/566 |
| 2012/0054263 A1 * | 3/2012 | Demant | G06F 9/54 709/203 |
| 2015/0227566 A1 * | 8/2015 | Tanaka | G06F 16/9577 707/722 |
| 2016/0070434 A1 * | 3/2016 | Clark | G06F 9/451 715/762 |
| 2018/0357289 A1 * | 12/2018 | Wittke | G06F 16/285 |
| 2021/0326930 A1 * | 10/2021 | Tran | G06F 3/0488 |
| 2021/0342446 A1 * | 11/2021 | Zeigler | G06F 9/30047 |

* cited by examiner

Primary Examiner — Jennifer N Welch
Assistant Examiner — Kuang F Chen
(74) Attorney, Agent, or Firm — Kilpatrick Townsend & Stockton LLP

(57) ABSTRACT

Techniques for server-based UI rendering are described. In an example, a system receives, from a device, a request associated with rendering a UI that includes multiple UI components. The system receives, from a first source associated with a first UI component, availability information indicating that the first UI component is available for use by other UI components. Based at least in part on the availability information, the system determines that the first UI component is available for use by a second UI component. The system receives, from a second source associated with the second UI component, event information indicating content presentable in the first UI component and an event trigger at the second UI component to present the content. Further, the system sends, to the device, a set of instructions associated with the rendering of the UI. The set of instructions includes the event information.

20 Claims, 14 Drawing Sheets

SERVER-BASED USER INTERFACE RENDERING

BACKGROUND

A device can present a user interface (UI) that supports different functionalities. For example, the UI can include UI components that correspond to portions of the menu. A UI component can be selected and, upon such a selection, the UI can be updated based on the functionality of the UI component.

BRIEF DESCRIPTION OF THE DRAWINGS

Various embodiments in accordance with the present disclosure will be described with reference to the drawings, in which.

DETAILED DESCRIPTION

Figure 1:
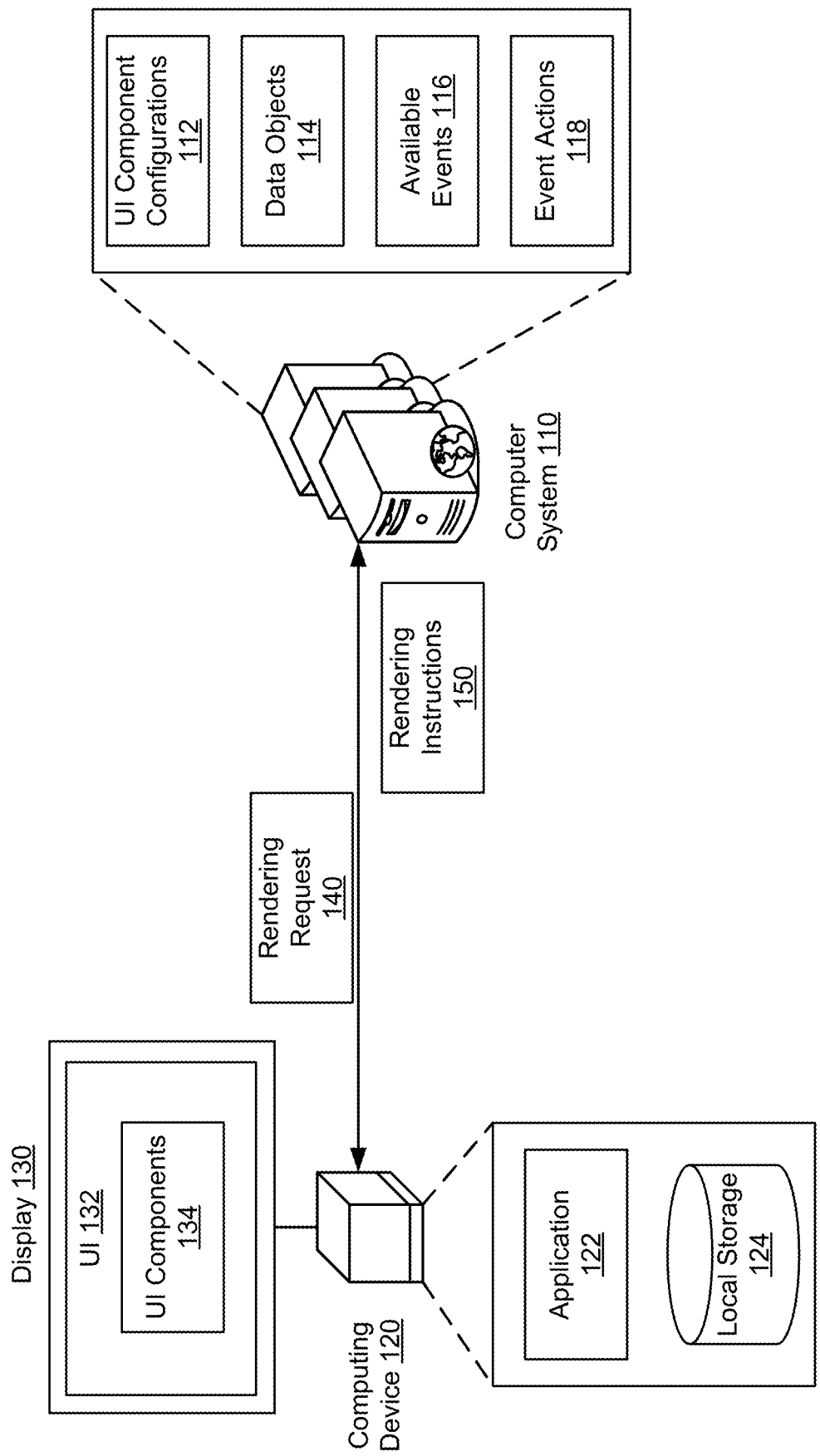
FIG. 1 illustrates an example of an environment for a server-based rendering of a user interface (UI), according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, server-based user interface (UI) rendering. In an example, a UI includes multiple UI components that support various UI-related functionalities. A device that presents the UI sends a request to a computer system (e.g., a server) for a instructions to render the UI components. In turn, the computer system determines the UI components and associations therebetween (e.g., lineage information indicating that a first UI component is a parent to a second UI component). The computer system also determines availability information indicating that a UI component is usable by other UI components (e.g., an available event that the first UI component supports, where this available event indicates that the first UI component can be used by the second UI component to present content in the first UI component). Based on the availability information and the associations between the UI components, the computer system can determine that the UI component is to be used by another UI component (e.g., the available event applies to the second UI component) and the relevant event information to use (e.g., a data object indicating content to be presented in the first UI component, and an event trigger that can be received or detected at the second UI component resulting in the presentation of the content). Accordingly, the computer system generates and sends, to the device, a set of instructions associated with rendering the UI. The set of instructions includes the event information. The set of instructions can also include other information related to the rendering, such as presentation properties of the UI components (e.g., a first presentation property of the first UI component indicating a height and width of this component and, similarly, a first presentation property of the second UI component) and data objects indicating content to present in the UI components (e.g., a first data object indicating first content to present in the first UI component absent the event trigger, and a second data object indicating second content to present in the second UI component).

To illustrate, consider a simplified example of a UI that includes a first UI component, a second UI component, and a third UI component. Each of second UI component and third UI component is presentable as a tile that shows a particular movie title and a poster image of the movie title. In comparison, the first UI component is presentable as an information space that shows metadata about a movie title (e.g. the release year, the actors, and the like). Upon a user selection of the second UI component, the metadata of the corresponding movie title is presented in the information space. Similarly, upon a user selection of the third UI component, the information space is updated to present the metadata of the other movie title. In this illustration, a device sends, to a computer system, a request associated with the rendering the UI. The request identifies the three UI components and their lineage (e.g., the first UI component is a parent to the other two remaining UI components). In turn, the computer system determines, from a first source, a first presentation property of the first UI component (e.g., its height and width) and a first data object to present in the first UI component (e.g., a blank image or text). Because the first UI component is usable for other UI components, the first source also indicates an available event informing the computer system that the first UI component can be targeted and an event action that this UI component supports (e.g., the presentation of metadata). In addition, the computer system determines, from a second source, a second presentation property of the second UI component (e.g., its height and width) and a second data object to present in the second UI component (e.g., the corresponding movie title and a network address of the corresponding poster image). Similar information is determined from a third source for the third UI component. Because the first UI component is a parent and because of the available event, the computer system determines that this available event is applicable to second UI component and the third UI component. Accordingly, the computer system determines, from the second source, the metadata to use for the corresponding movie title and an event trigger to present this metadata (e.g., the user selection of the second UI component). Similar event information is determined from the third source. The computer system generates a set of instructions that includes the first presentation property, the first data object, the second presentation property, the second data object, and the event information determined from the second and third sources. The set of instructions is sent to the device in response to the request. Based on the set of instructions, a renderer and event handlers at the device can present the UI and handles events triggered at the UI components (e.g., a user selection of the second UI component resulting in the presentation of the corresponding movie title's metadata in the first UI component).

Embodiments of the present disclosure provide various technological improvements. In an example, the server-based UI rendering is more flexible and scalable than a device-based UI rendering. For example, the overall UI layout and/or functionalities can be updated without the need for an over the air (OTA) update to devices that presents instances of the UI. Further, each UI component can be individually updated and managed at a source and UI components can be added or removed. Such updates can result in different types of events that can be exchanged between the UI components. Such updates and the event information can be supported, whereby the computer system orchestrates the exchange between the sources to determine the relevant event information, and generate and send the proper instructions to devices. In addition and as further described herein below, a caching policy can be used at a device, whereby instructions can be generated without the need for the computer system to fetch data objects from sources, thereby reducing the overall processing latency associated with generating the instructions and responding to a request from the device. The caching policy can also enable the device to avoid requesting updates to UI components for which data objects have been cached, thereby reducing the overall presentation latency.

FIG. 1 illustrates an example of an environment for a server-based rendering of a UI according to at least one embodiment. As illustrated, the environment includes a computer system 110 configured as a server that provides a server-based UI rendering service to client. The environment also includes a computing device 120 configured as a client of the server. The computing device 120 is coupled or includes a display 130 and renders a UI 132 on the display 130 based on the server-based UI rendering service. The UI 132 includes multiple UI components 134, each of which provides a UI functionality. The UI components 134 are configured according to UI component configurations 112 and data objects 114 that the computer system 110 manages. Events can also occur between the UI components 134 (e.g., a user selection of a first UI component resulting in the presentation of content or some other event action in a second UI component). The events are supported according to available events 116 and event actions 118 that the computer system 110 also manages.

In an example, the computer system 110 can be operated by a service provider and implemented as hardware (e.g., a set of hardware servers) or software hosted on hardware (e.g., a cloud-based service) suitable for communication with computing devices over one or more data networks. Generally, the computer system 110 includes one or more processors and one or more memory that store computer-readable instructions that, upon execution by the one or more processors, configure the computer system 110 to provide the server-based UI rendering service.

In comparison, the computing device 120 can be operated by an end user and can be any suitable device that communicates with the computer system 110 over one or more data networks and that presents a UI. Examples of the computing device 120 include a smart phone, a tablet, a laptop, a desktop, a set-top box device, a multimedia streaming device, a television, an Internet of Things (IoT) device, and the like. Generally, the computing device 120 includes one or more processors and one or more memory that store computer-readable instructions that, upon execution by the one or more processors, configure the computing device to provide render the UI 132 based on the server-based UI rendering service. At least a portion of the computer-readable instructions correspond to an application 122 that renders the UI 132. This application 122 can include, among other things, a renderer and UI event handlers. The one or more memory can also include local storage 124, such as cache, storing various data objects and instructions of the computer system 110 in support of the rendering by the application 122.

In an example, the computing device 120 sends a rendering request 140 to the computer system 110. The rendering request 140 can relate to rendering and/or refreshing the rendering of the entire UI 132 or a portion of the UI 132. The rendering request 140 can indicate the UI components 134 to be rendered (or, for which a refresh is requested) by, for instance, including identifiers of the UI components (e.g., references that the computer system 110 can use in a look-up to determine UI modules responsible for configuring UI components 134 as further described in the next figures). The rendering request 140 can also indicate associations between the UI components 134 by including, for instance, lineage information specifying different ancestor-descendant (or parent-child) relationships between the UI components 134. The lineage information can be provided as key-value pairs, where a key includes an identifier of a UI component and a value includes identifier(s) of the UI component's ancestor(s) and/or descendant(s). Further, the rendering request 140 can include cache filter information indicating data objects that are stored at the computing device 120 (e.g., in the local storage 124). For instance, the rendering request 140 includes identifiers of the data objects, such as hashes thereof. Additionally, the rendering request 140 can indicate a context of the computing device 120, user of the computing device 120, and/or rendering request 140. For instance, contextual information can be included indicating a type of the computing device 120, the application 122, a user preference, and the like.

In response to the rendering request 110, the computer system can generate and send rendering instructions 150 to the computing device 120. The rendering instructions 150 can be a set of instructions that contain the relevant information to render the UI 132 and support events between the UI components 134. Depending on, for instance, the type of application 122, the rendering instructions 150 can be sent as a file having a specific format, such as A Programming Language (APL) file, a JSON file, a HyperText Markup Language (HTML) file, a text file, or a byte array. Generally, the rendering instructions 150 include the relevant information that enables the application 122 to render each UI component and support events between the UI components 134. For instance, the rendering instructions 150 can include, for each UI component, presentation properties (e.g., height, width, position in the UI 132, foreground or background layering, and the like), one or more data objects (if not already stored in the local storage 124, or if already stored but expired), and event information. A data object can include a file, a portion of a file, or a reference thereto at least indicating content (whether static as an image or dynamic as an animation or a video) to be presented in a UI component. Event information can indicate an event action at a first UI component (e.g., a UI functionality to be provided by the first UI component) to be performed upon a trigger received or detected at a second UI component (e.g., a user selection of the second UI component resulting in an image, an animation, or some other content being presented in the first UI component). The event information can also include a data object (e.g., a payload) to be used for performing the event action.

As such, a UI component is configured by at least having associated therewith presentation properties and data objects. When an event action is to be supported, the UI component is further configured by at least having associated therewith event information. The configurations of the UI components 134 are included in the rendering instructions 150. The application 122 renders the UI components 134 according to the received UI component configurations.

In an example, to generate the rendering instructions 150, the computer system 110 manages UI component configurations 112, data objects 114, available events 116, and event actions 118. As explained above, a UI component configuration indicates presentation properties and one or more data objects to use when rendering the corresponding UI component. The computer system 110 can determine the UI component and the data object(s) from a source (e.g., a computing service) responsible for the UI component, as further illustrated in FIG. 4. The data objects 114 corresponds to the data objects indicated by the UI component configuration 112. Such data objects 114 can be sent to and stored at the computing device 120. An available event 116 indicates that a UI component supports an event action and thus can be available for use by other UI components (e.g., targeted to perform the event action when a corresponding event is triggered at another UI component). An event action can have at least a type and one or more data objects such that a UI functionality can be provided by the targeted UI component. The managing and use of the UI component configurations 112, data objects 114, available events 116, and event actions 118 are further described in the next figures.

Figure 2:
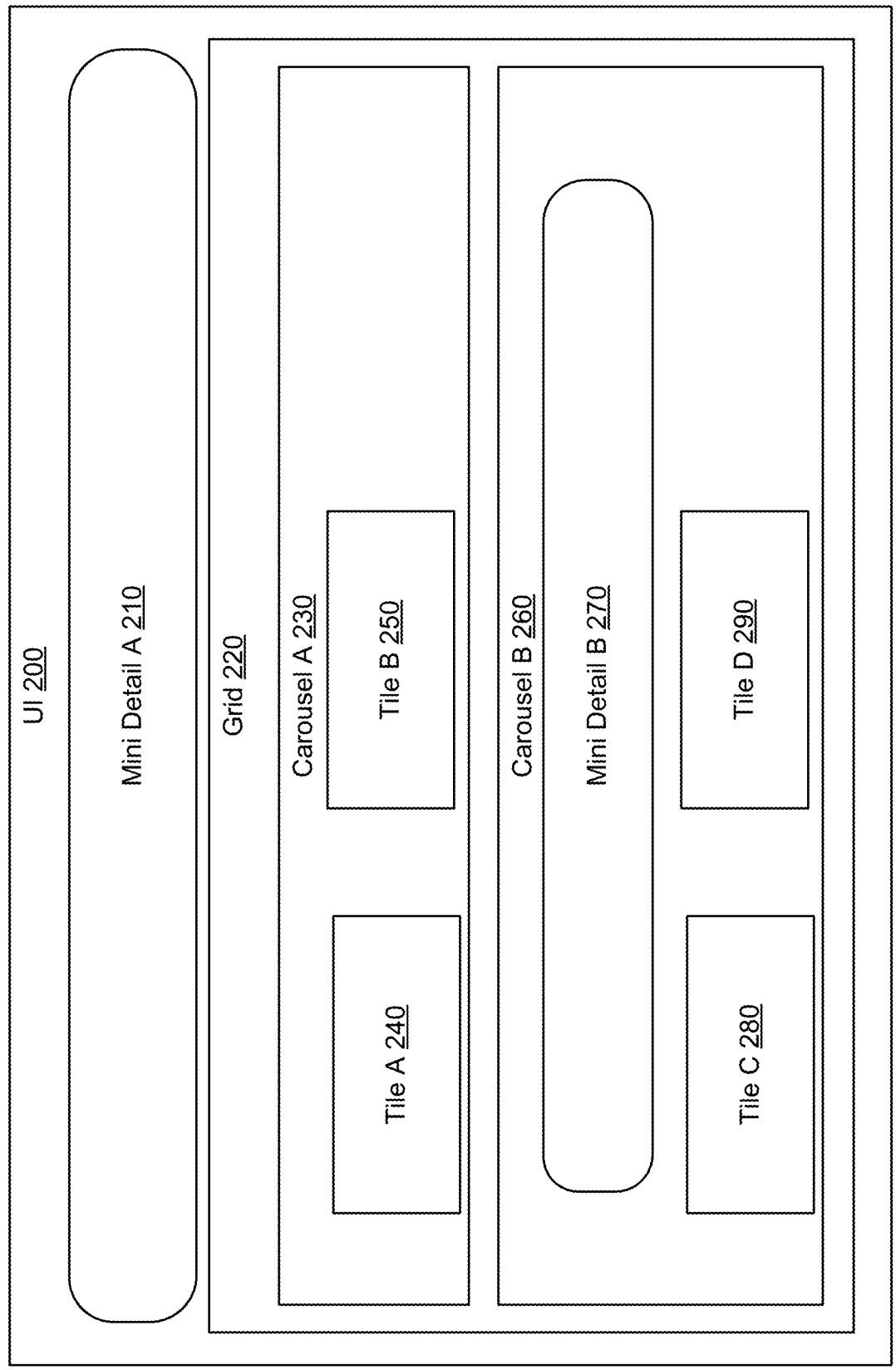
FIG. 2 illustrates an example of a UI, according to at least one embodiment.

FIG. 2 illustrates an example of a UI 200, according to at least one embodiment. The UI 200 is provided herein for illustrative purposes only. A different layout, arrangement, number and/or types of UI components, and/or functionalities of the UI 200 are possible.

As illustrated, the UI includes a mini detail A 210 space, a grid 220 below the mini detail A 210 space, a carousel A 230 shown in the grid 220, a tile A 240 and a tile B 250 shown next to each other in the carousel A 230, a carousel B 260 in the grid 220 and below the carousel A 210, a mini detail B 270 space in the carousel B 260, a tile C 280 in the carousel B 260 and below the mini detail B 270 space, and a tile D 290 next to the tile C 280. Each of these components represents a UI component that provides a different function.

In an example, the mini detail A 210 space is a UI component that can present metadata about a movie title (e.g., movie title's actor, release date, etc.). Each of the tile A 240 and tile B 250 can be a UI component that indicates a movie title (e.g., "ACME Movie 123" in tile A 240 and "ACME Movie 456" in tile B 250). The mini detail A 210 space can be associated with an available event, where this available event applies to tile A 240 and tile B 250. A user selection of tile A 240 can result in an event action to present the metadata about "ACME Movie 123" in the mini detail A 210 space. Similarly, a user selection of tile B 250 can result in an event action to present the metadata about "ACME Movie 456" in the mini detail A 210 space.

Likewise, the mini detail B 270 space is a UI component that can present metadata about a movie title (e.g., movie title's actor, release date, etc.). Each of the tile C 280 and tile D 290 can be a UI component that indicates a movie title (e.g., "ACME Movie ABC" in tile C 280 and "ACME Movie DEF" in tile D 290). The mini detail B 270 space can be associated with an available event, where this available event applies to tile C 280 and tile D 290 but not tile A 240 nor tile B 250. A user selection of tile C 280 can result in an event action to present the metadata about "ACME Movie ABC" in the mini detail B 270 space. Similarly, a user selection of tile D 290 can result in an event action to present the metadata about "ACME Movie DEF" in the mini detail B 270 space.

In this example, the grid 220 can be a UI component that organizes the other UI components included therein in a grid pattern. Each of the carousel A 230 and carousel B 260 can be a UI component that organizes UI components included therein in a pattern (e.g., a ribbon) and enables scrolling through these UI components (e.g., scrolling from left to right and vice versa such that a UI component can exit and/or enter the viewed portion of the UI 200)). Such scrolling can result in a refresh of the UI 200 to remove shown tile(s) and/or show additional tile(s).

Figure 3:
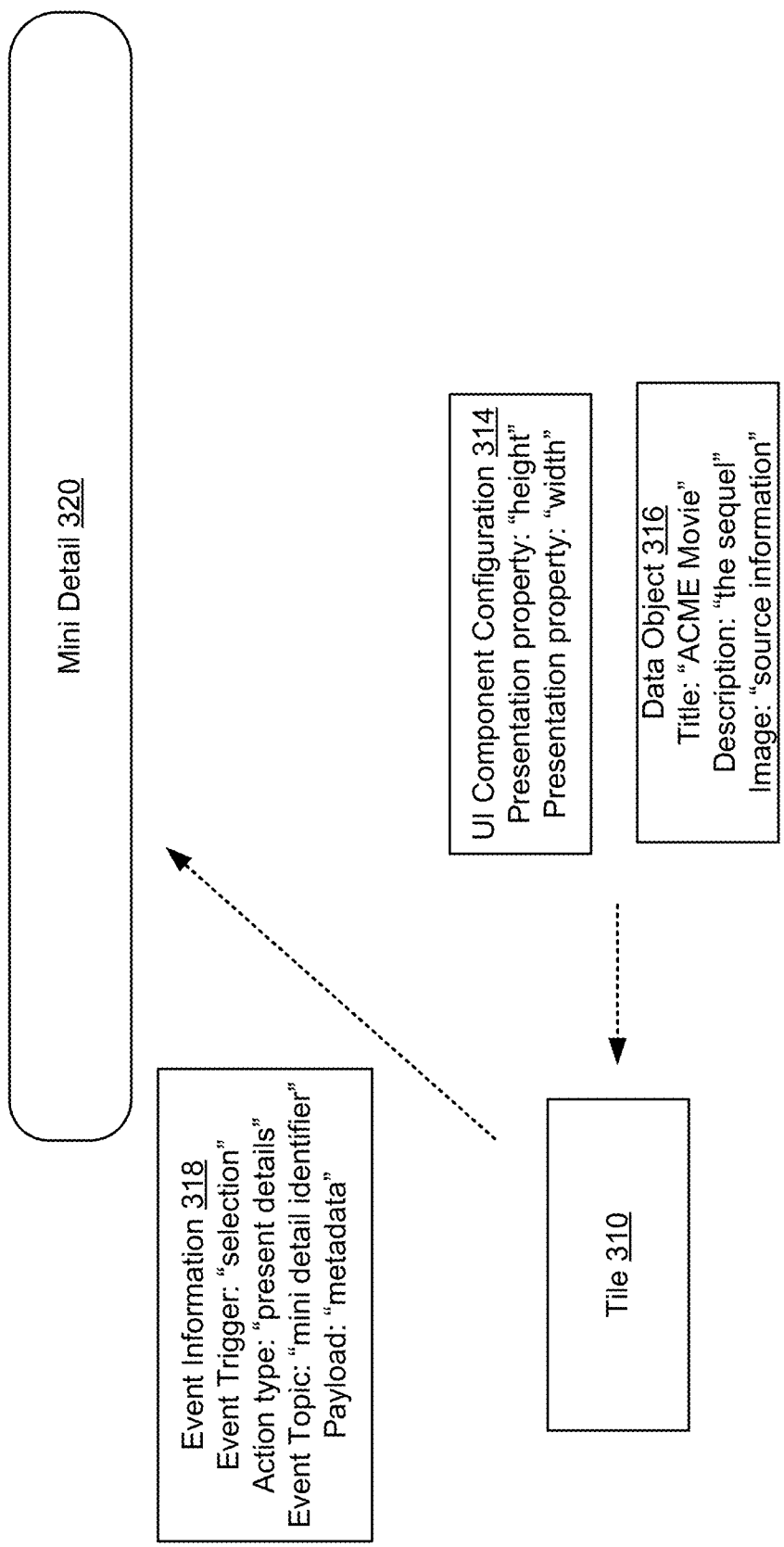
FIG. 3 illustrates an example of an event between UI components, according to at least one embodiment.

FIG. 3 illustrates an example of an event between UI components, according to at least one embodiment. In this figure, a tile 310 and a mini detail 320 are described as examples of the UI components. The tile 310 can correspond to the tile A 240 or tile B 250 when the mini detail 320 corresponds to mini detail A 210. Alternatively, the tile 310 can correspond to the tile C 280 or tile D 290 when the mini detail 320 corresponds to mini detail B 270.

A UI component configuration 314 and a data object 316 can be specified for the tile 310 (e.g., included in a set of instructions from a computer system) to enable the rendering of the tile 310 in a UI (e.g., by a renderer of an application executing on a computing device). The UI component configuration 314 can indicate presentation properties of the tile 310, such as its height and width among other visual properties. The data object 316 can indicate content to present in the tile 310, such a title of a movie, a description of the movie, and source information for a poster image to present. The source information can indicate a source from which the poster image (or other content, as applicable) is available. The source can be a network location, where the source information include a network address (e.g., a uniform resource locator (URL)). Alternatively, the source can be local storage of the computing device (e.g., cache).

Event information 318 can also be specified for the tile 310 (e.g., included in the set of instructions) to enable an event between the tile 310 and the mini detail 320. An event handler of the application can detect an event trigger at the tile 310, such as a user selection thereof, and cause an update to the mini detail 320 according to the event information 318, such as the presentation of metadata about the movie. The event information 318 can include an event trigger to be detected (e.g., a user selection), a type of an event action to perform upon the detection of the event trigger (e.g., present details, such as from metadata), an event topic that can represent a target of the event action (e.g., can identify the mini detail 320 space), and a payload. The event topic can include an identifier of the target (e.g., the mini detail 320 space), of a functionality that the target (e.g., the support of presenting detail information), and/or a framework level identifier that enables an event handler to determine the target. An identifier can be a string. The payload can include or indicate the content to use for performing the event action (e.g., the metadata to present in the mini detail 320 space). The payload can be set as a data object.

Other types of information can also be included in the event information 318. For example, event actions can be sequenced, whereby a first event action is performed in a first UI component and a second event action is performed in a second UI component subsequent to, in parallel, or in a partially overlapping manner with the first event action. In this case, the event information specified for the first event action can include a continuation trigger (a second event trigger, whereas the event trigger of the first event action is a first event trigger) that, upon detection by the event handler of the application, causes the second event action to be performed. In this example, the event information specified for the second event action can also include the same continuation trigger.

Figure 4:
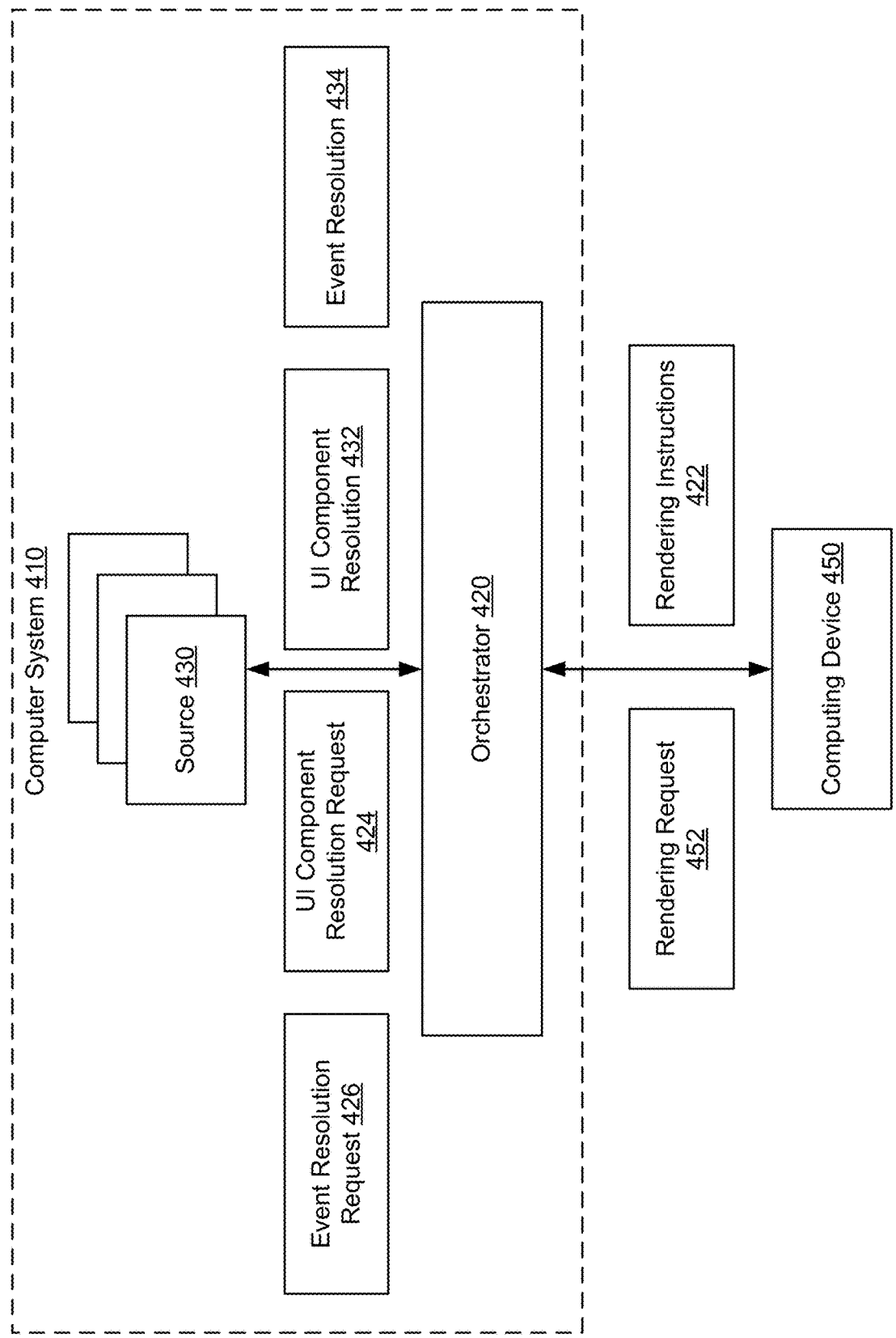
FIG. 4 illustrates an example of modules that support events between UI components, according to at least one embodiment.

FIG. 4 illustrates an example of modules that support events between UI components, according to at least one embodiment. Each module can be implemented as dedicated hardware or software executing on hardware. As illustrated, a computer system 410 can be communicatively coupled with a computing device 450. In response to a rendering request 452 from the computing device 450, the computer system 410 sends rendering instructions 422. The computer system 410 and the computing device 450 are examples of the computer system 110 and the computing device 120, respectively, of FIG. 1. Similarly, the rendering request 452 and the rendering instructions 422 are examples of the rendering request 140 and the rendering instructions 150, respectively, of FIG. 1.

In an example, the computer system 410 includes multiple modules, such as an orchestrator 420 and sources (FIG. 4 refers to a single source with element number 430). Such modules can be implemented on a single server or distributed across multiple servers. In addition, the orchestrator 420 can be managed by a set of administrators, whereas each one of the sources can be managed by a different set of administrators. Generally, the orchestrator 420 is configured to generate the rendering instructions 422 by orchestrating information about UI components available from the sources. Each source 430 is responsible for configuring one or more UI components. A source 430 responsible for a UI component can be implemented as a resolver of the UI component. The resolver returns presentation properties and data object(s) of the UI component, among other information as further described herein below.

In an example, the orchestrator 420 receives the rendering request 452 (e.g., via an application programming interface (API) call) and determines therefrom identifiers of UI components of a UI (or a portion of a UI) to be rendered at the computing device 450, lineage information of the UI components, data objects previously stored at the computing device 450, and contextual information. Based on the identifiers, the orchestrator 420 determines the sources that are responsible for the UI components (e.g., based on an API call to a router, not shown in FIG. 4, that maintains a mapping between sources and UI components). To each identified source 430, the orchestrator sends a UI component resolution request 424 (e.g., via an API call) requesting that the source 430 returns a UI component resolution 432.

The UI component resolution request 424 can indicate, among other things, the corresponding UI component and the contextual information. The UI component resolution 432 can indicate the presentation properties of the UI component, the data object(s) to bind to the UI component and, as applicable, availability information. The availability information indicates that the UI component is available for use by other UI components of the UI. For instance, the availability information includes an available event that specifies a type of an event action that can be supported and an event topic such that a target to which the UI component listens. In addition, the UI component resolution 432 can indicate (e.g., as a Boolean flag) whether an available event of another UI component should apply to the UI component that is being resolved by the source 430, should apply to a descendant of the UI component, and/or should be bubbled up to an ancestor of the UE component. If an available event is applicable to the UI component, the UI component resolution 432 can indicate that a selection to opt out of the available event such that the UI component would not use or subscribe to the available event. Opting out can be included, in the UI component resolution 432, as a Boolean flag (e.g., set to true or false), as a target set to a null, or using any other type of information that indicates the opting out. Further, the UI component resolution 432 can indicate one or more additional UI components that need to be resolved, where such UI component(s) may not be indicated by the rendering request 452.

Given the UI component resolutions received from the different sources, the orchestrator 420 determines the presentation properties and data objects of the different UI components. Based on the information about the data objects previously stored at the computing device 450 (e.g., cache filter information), the orchestrator 420 determines the particular data objects that are to be sent to the computing device 450 (e.g., the ones that are not previously stored thereat and/or previously stored but expired ones). In addition, the orchestrator 420 determines available events from the UI component resolutions received. Based on the lineage information, the Boolean flags about applicability of available events and a set of rules, the orchestrator 420 determines whether an available event is applicable to a UI component. For example, when two (or more) available events can apply to the UI component and are of the same type of event actions, the orchestrator 420 can determine that only one of the two available events are to be applied. In this example, the rules can specify the selection of the available event corresponding a lower level of the lineage information. In another example, when two (or more) available events can apply to the UI component and are for different types of event actions, the rules can allow the orchestrator 420 to determine that these available events are to be applied. In this example, the UI component is associated with multiple available events. These and other functionalities of the orchestrator 420 are further described in the next figures.

Upon determining that an available event is applicable to a UI component, the orchestrator 430 can further send an event resolution request 426 (e.g., via an API call) to the source 430 responsible for the UI component. In response, the source 430 returns an event resolution to the orchestrator 420. The event resolution request 426 can include some or all of the availability information about the available event (e.g., the type of event action, the event topic, and the like). The event resolution 434 can include some or all of the event information (e.g., an event trigger (e.g., a first event trigger), a continuation trigger (e.g., a second event trigger for sequencing event actions), an event topic, and a payload).

Accordingly, the orchestrator 420 first receives UI component resolutions that define the configurations and data objects of the UI components and, subsequently, receives event resolutions that define event information. The orchestrator 420 generates the rendering instructions 422 by including the configurations, some or all of the data objects (as applicable depending on the data objects previously stored at the computing device 450), and event information in the rendering instructions 422.

Figure 5:
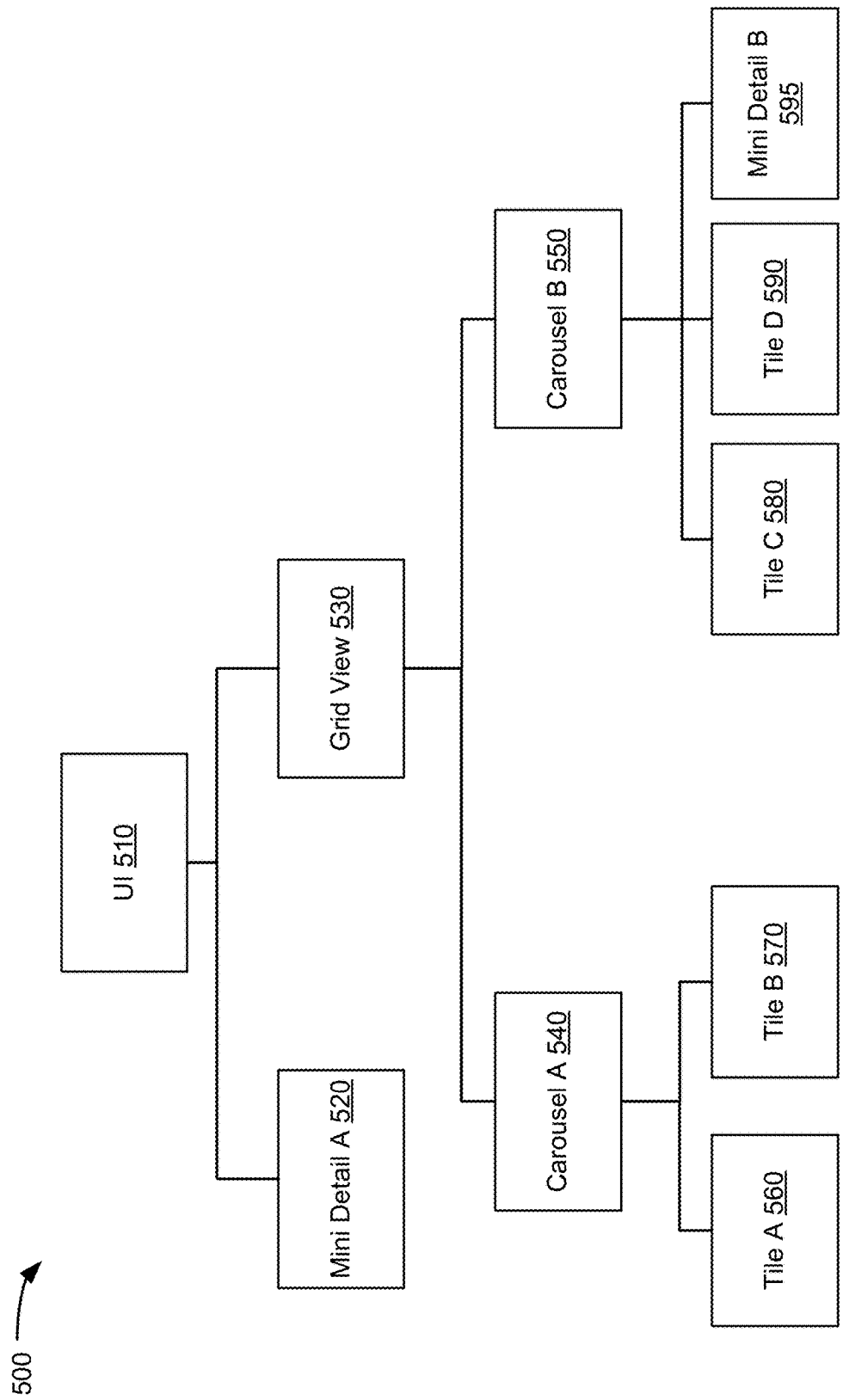
FIG. 5 illustrates an example of a UI tree, according to at least one embodiment.

FIG. 5 illustrates an example of a UI tree 500, according to at least one embodiment. The UI tree 500 corresponds to the UI 200 of FIG. 2 and is provided herein for illustrative purposes only. A different tree structure is possible and can depend on the underlying UI.

In an example, the UI tree 500 represents lineage information of UI component of the UI and can be stored as key-value pairs. A key of a pair can indicate a UI component, and a value of the pair can indicate ancestor(s) and/or descendant(s) of the UI component. Each UI component can be represented as a node in the UI tree 510. Each node can be associated with a source (e.g., a resolver) that provides a UI component resolution and, as applicable, an event resolution for the UI component that corresponds to the node.

As illustrated in FIG. 5, the UI tree 500 can include multiple hierarchical levels. At the highest hierarchy level is a root node that corresponds to a UI 510 (e.g., the UI 200). Two descendant nodes exist at the next hierarchical level: one for a mini detail A 520 space (the mini detail A 210 space) and one for a grid view 530 (e.g., the grid view 220). The node of the mini detail A 520 space has no descendants. The grid view's 530 node has two descendants shown at the next hierarchical level: one for a carousel A 540 (the carousel A 230) and one for a carousel B 550 (e.g., the carousel B 260). Descendants exists from each of these two nodes and are found and the lowest hierarchical level. In particular, carousel A's 540 node has two descendants: one corresponding to tile A 560 (the tile A 240) and one corresponding to tile B 570 (the tile B 250). In comparison, carousel B's 550 node has three descendants: one corresponding to tile C 580 (the tile C 280), one corresponding to tile D 590 (the tile D 290), and one corresponding to a mini detail B space 595 (the mini detail B 270 space).

Figure 6:
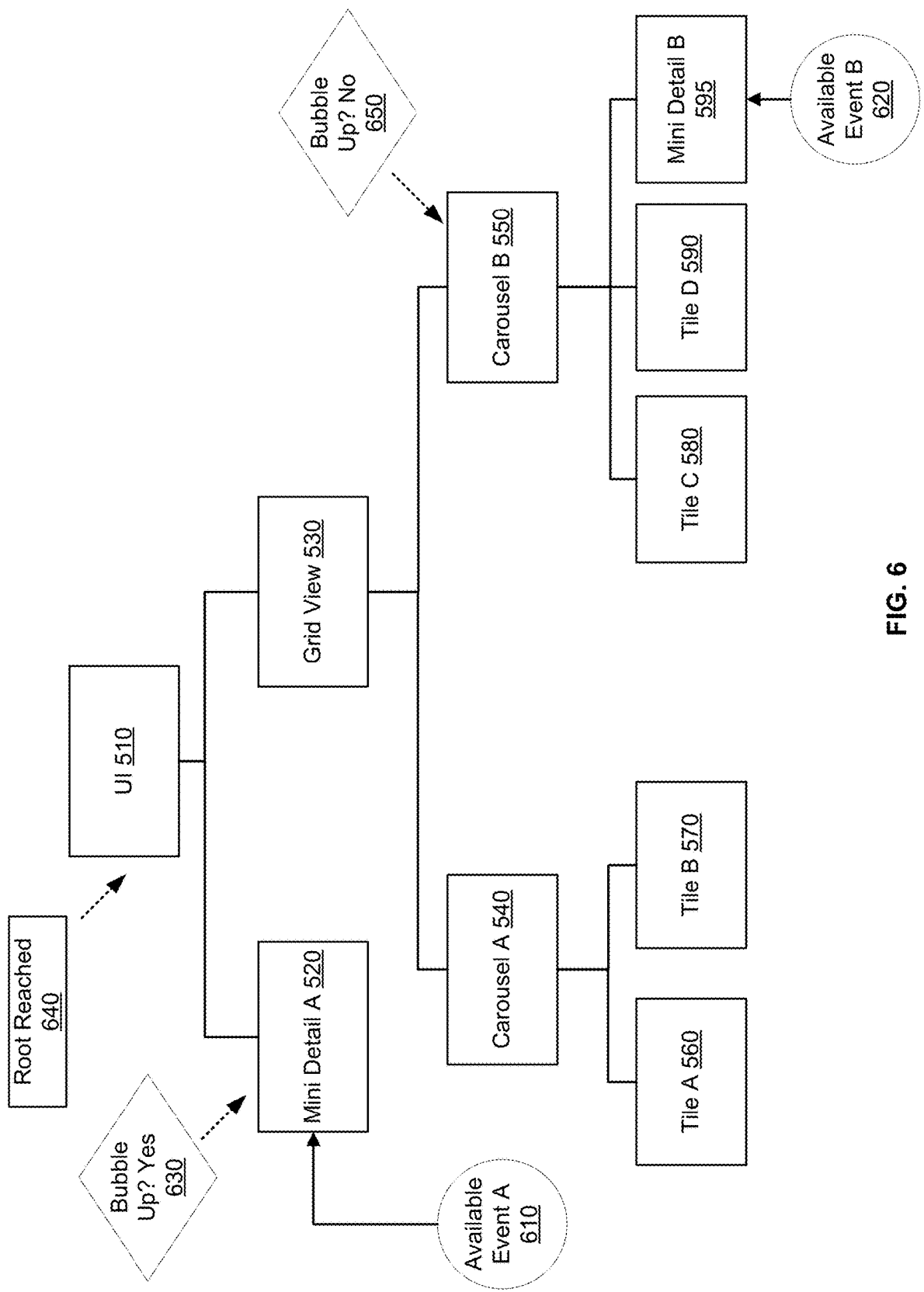
FIG. 6 illustrates an example of available events propagated based on a UI tree, according to at least one embodiment.

FIG. 6 illustrates an example of available events propagated based on a UI tree, according to at least one embodiment. Here, the UI tree is the UI tree 500 of FIG. 5, as indicated by re-using the same element numbers. Generally, a source responsible for a UI component can indicate an available event that can be targeted by other UI components, such that the UI component is available for use upon event triggers at these other UI components. The available event can be propagated based on the structure represented in the tree 500 using different mechanisms. FIG. 6 illustrates a bubble up mechanism, although other mechanisms are possible (e.g., a top-down mechanism).

Once a source indicates an available event from a UI component corresponding to a node, this available event can be bubbled up to ancestors of this node, and an orchestrator can maintain data indicating whether the available event applies to the UI components corresponding to the ancestors. The bubbling up can be via API calls, where a source responsible for a UI component can return a response (e.g., a set of Boolean flags) indicating whether the available event should apply to the UI component, whether the application to the UI component is unknown (in which case, the event action is further bubbled up by default), and whether the available event should no longer be bubbled up. In an example, the bubbling up follows rules indicating that an available event is to be bubbled up to the root node (e.g., corresponding to the UI 510) unless a descendant node thereof stops the bubbling up.

As illustrated, a first source corresponds to the mini detail A 520 space. This first source indicates an available event A 610 (e.g., a first available event related to presenting metadata in the mini detail A 520 space). This first event is bubbled up 630 to until the root node is reached 640. As such, the available event A 610 can be applicable to the different UI components.

A second source corresponds to the mini detail B 595 space. This second source indicates an available event B 620 (e.g., a second available event related to presenting metadata in the mini detail B 595 space). This event is bubbled up 650. Here, a third source corresponding to the carousel B 550 indicates that this second available event should not be further bubbled up. As such, the available event B 620 can be applicable to carousel B 550 and its descendants, but not to the remaining UI components.

Figure 7:
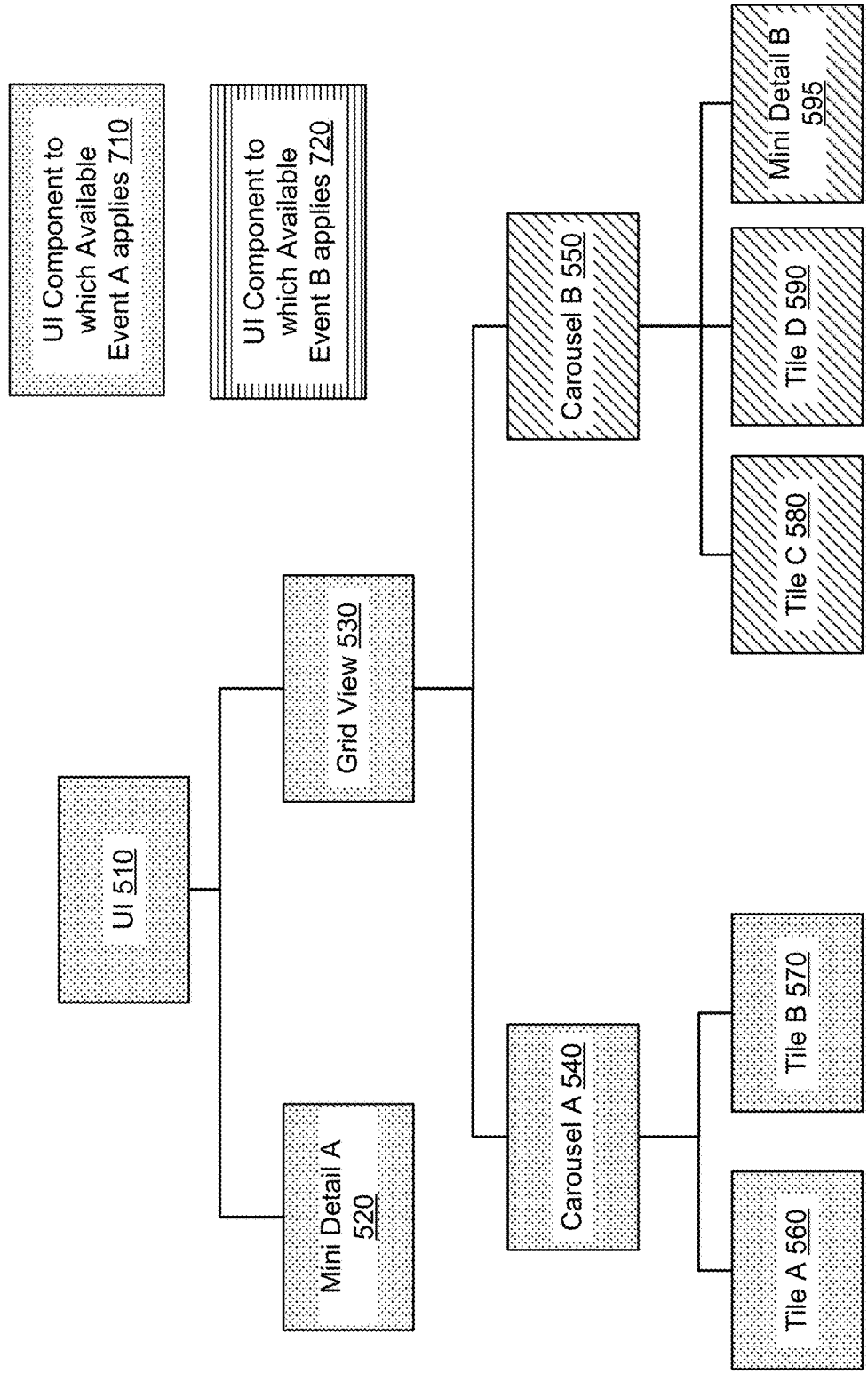
FIG. 7 illustrates an example of available events determined to be applicable to UI components, according to at least one embodiment.

FIG. 7 illustrates an example of available events determined to be applicable to UI components, according to at least one embodiment. Here also, the example UI tree 500 and available events of FIG. 6 are used for illustrative purposes. Generally, an orchestrator relies on a set of rules to determine the final applicability of available events to UI components. The set of rules can also specify that an available event bubbled up to a node is also applicable to the descendants thereof (unless a descendant indicates otherwise). The set of rules can also specify that multiple available events can apply to a UI components if they are for different types of event actions. If they are for a same type of event actions, the set of rules can indicate that the available event bubbled up to the lowest hierarchical level is to be selected. Once the final applicability of an available event is determined, the orchestrator can store information indicating the UI components to which the available event applies. This information can identify the available event and the UI component of the ancestor node at the highest hierarchical level to which the available event was bubbled up and/or the UI components of the descendant node(s)).

Referring back to the example available events of FIG. 6, available event A 610, but not available event B 620, was found to be applicable to tile A 560 and tile B 570. As such, the orchestrator stores information indicating that the first available event is applicable to tile A 560 and tile B 570. In comparison, both available event A 610 and available event B 620 were found to be applicable to tile C 580. Assuming that these two events are for a same event action type, a conflict exists. The set of rules is applied resulting in the selection of available event B 620 because this event was bubbled up all the way to carousel B 550, whereas the available event C 610 was bubbled up to the UI 510, and because the carousel B 550 is at a lower hierarchical level than UI 510. As such, the orchestrator stores information indicating that the second available event is applicable to tile C 580. Using such rules, the final applicability of the two available events is indicated in FIG. 7: a dotted rectangle indicates a UI component 710 to which the available event A 610 applies, a diagonally shaded rectangle indicates a UI component 720 to which the available event B 620 applies.

Figure 8:
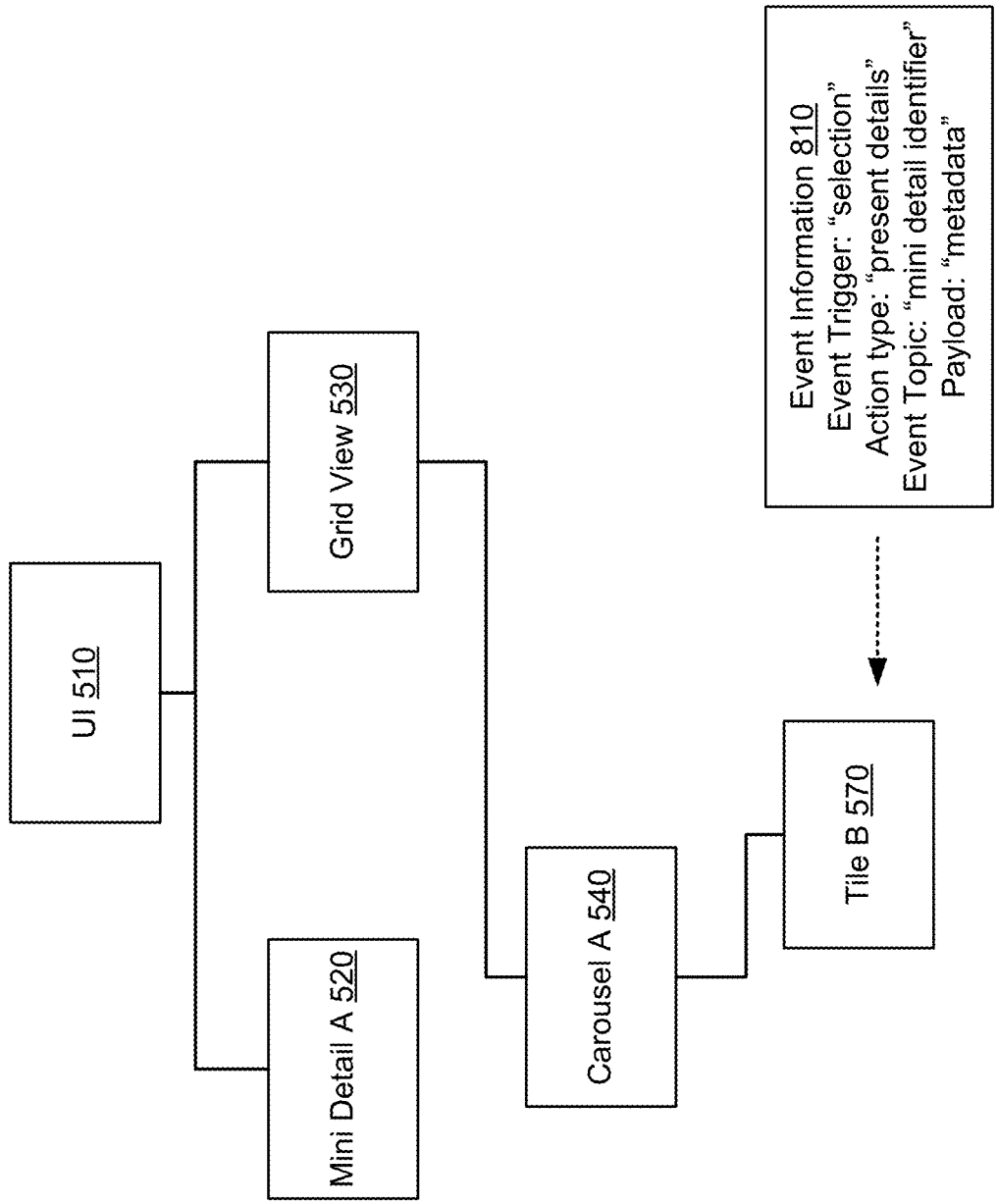
FIG. 8 illustrates an example of event action determined for an available event, according to at least one embodiment.

FIG. 8 illustrates an example of event action determined for an available event, according to at least one embodiment. For illustrative purposes only, the event action is described in connection with tile B 570. However, the embodiments of the present disclosure are not limited as such. Instead, an event action can be similarly defined for any UI component for which an available event is usable.

As described herein above, the orchestrator has determined that available event A 610 is applicable to tile B 570. As such, the orchestrator can request a source responsible for configuring tile B 570 to return an event resolution associated with using the available event A 610. The event resolution request can indicate the available event A 610. The event resolution can include event information 810.

In the illustration of FIG. 8, the event information 810 indicates that upon a user selection of tile B 570, details about the movie title corresponding to tile B 570 are to be presented in a mini detail space, and the metadata to use for this presentation.

Figure 9:
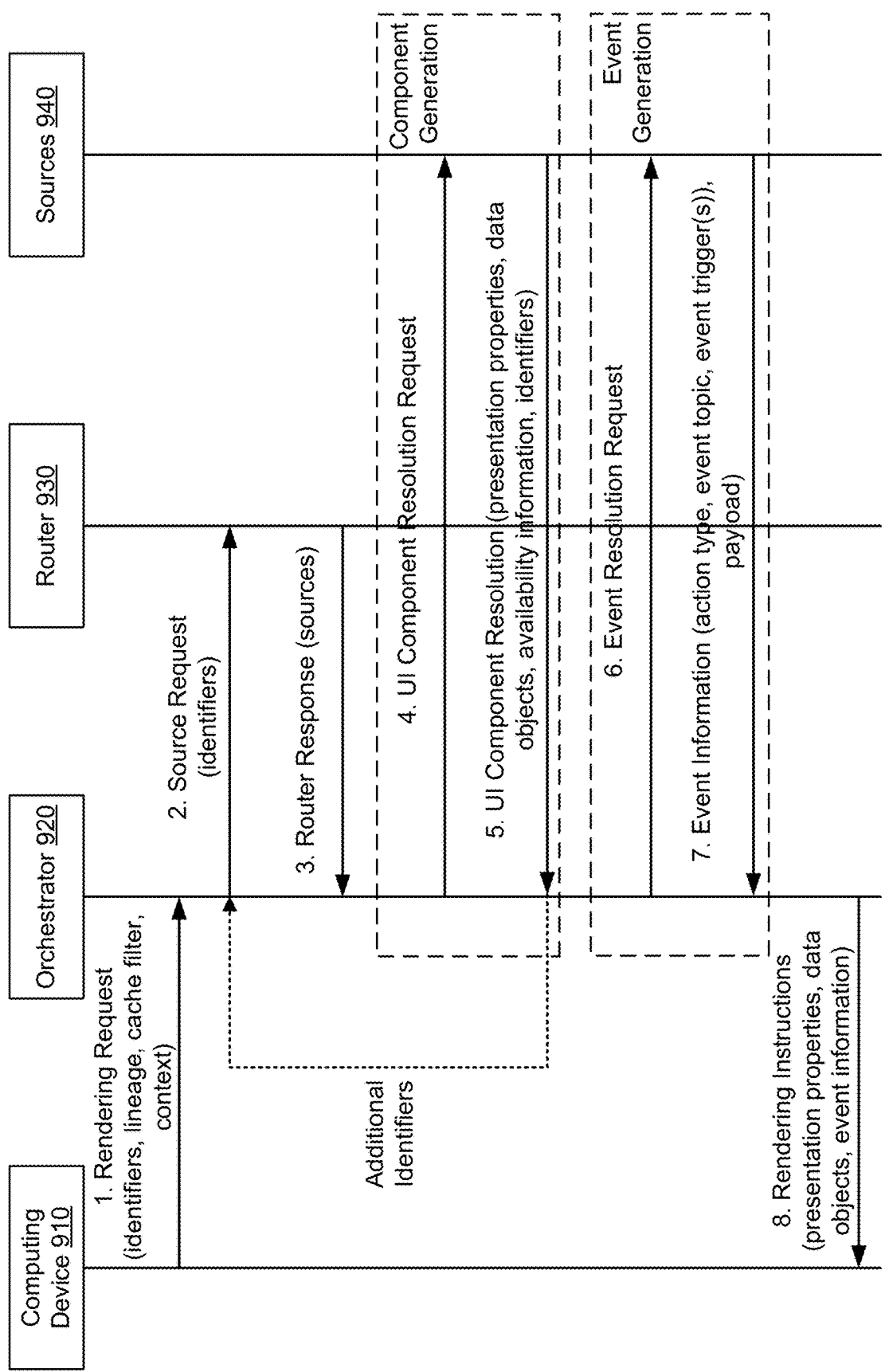
FIG. 9 illustrates an example of a sequence diagram for a server-based UI rendering, according to at least one embodiment.

FIG. 9 illustrates an example of a sequence diagram for a server-based UI rendering, according to at least one embodiment. The sequence diagram is usable to generate UI component resolutions and event resolutions in a manner similar to the techniques described in FIGS. 4-8. In the illustration of FIG. 9, a computing device 910 sends a rendering request to a computer system that implements an orchestrator 920, a router 930, and sources 940. The rendering request can include identifiers of UI components to be rendered, lineage information about the UI components, cache filter information, and contextual data. In turn, the orchestrator 920 can send a source request to the router 930, where this request includes the identifiers of the UI components. The router 930 sends back a router response to the orchestrator 920 identifying the sources that are responsible for the UI components.

Next, a component generation phase is performed to resolve UI components. In this phase, the orchestrator sends, to each identified source, a UI component resolution request. A source responsible for a UI component responds with UI component resolution for the UI component. This UI component resolution can indicate presentation properties, data objects, availability information (specifying one or more available events) as applicable, and identifiers of additional UI components that need to be resolved as applicable (where these UI components are not indicated by the rendering request of the computing device 910). If an additional identifier(s) is(are) returned, the orchestrator 930 can send and receive the relevant source request and router response to then identify the relevant source(s) and resolve the additional UI component(s), as indicated with the dotted arrow.

Once the UI components are resolved, an event generation phase can be performed to resolve events, assuming that available events were determined in the component generation phase. Here, the orchestrator 920 determines than an available event is applicable to a UI component, determines the source of the UI component, and sends an event resolution request to this source. In response, the source returns event information indicating an action type, an event topic, one or more trigger events (e.g., including continuation trigger(s) as applicable), and a payload.

Once the different events are resolved, the orchestrator 920 generates and sends rendering instructions to the computing device 910. The rendering instructions can indicate the presentation properties of the UI components, data objects to use, and event information.

FIGS. 7-11 illustrate flows associated with server-based UI rendering. Some or all of the flows (or any other flows described herein, or variations, and/or combinations thereof) may be performed under the control of one or more computer systems, such as the computer system 110 in FIG. 1, configured with executable instructions and may be implemented as code (e.g., executable instructions, one or more computer programs, or one or more applications) executing collectively on one or more processors, by hardware or combinations thereof. The code may be stored on one or more computer-readable storage media, for example, in the form of a computer program comprising a plurality of instructions executable by one or more processors. The computer-readable storage media are non-transitory.

Figure 10:
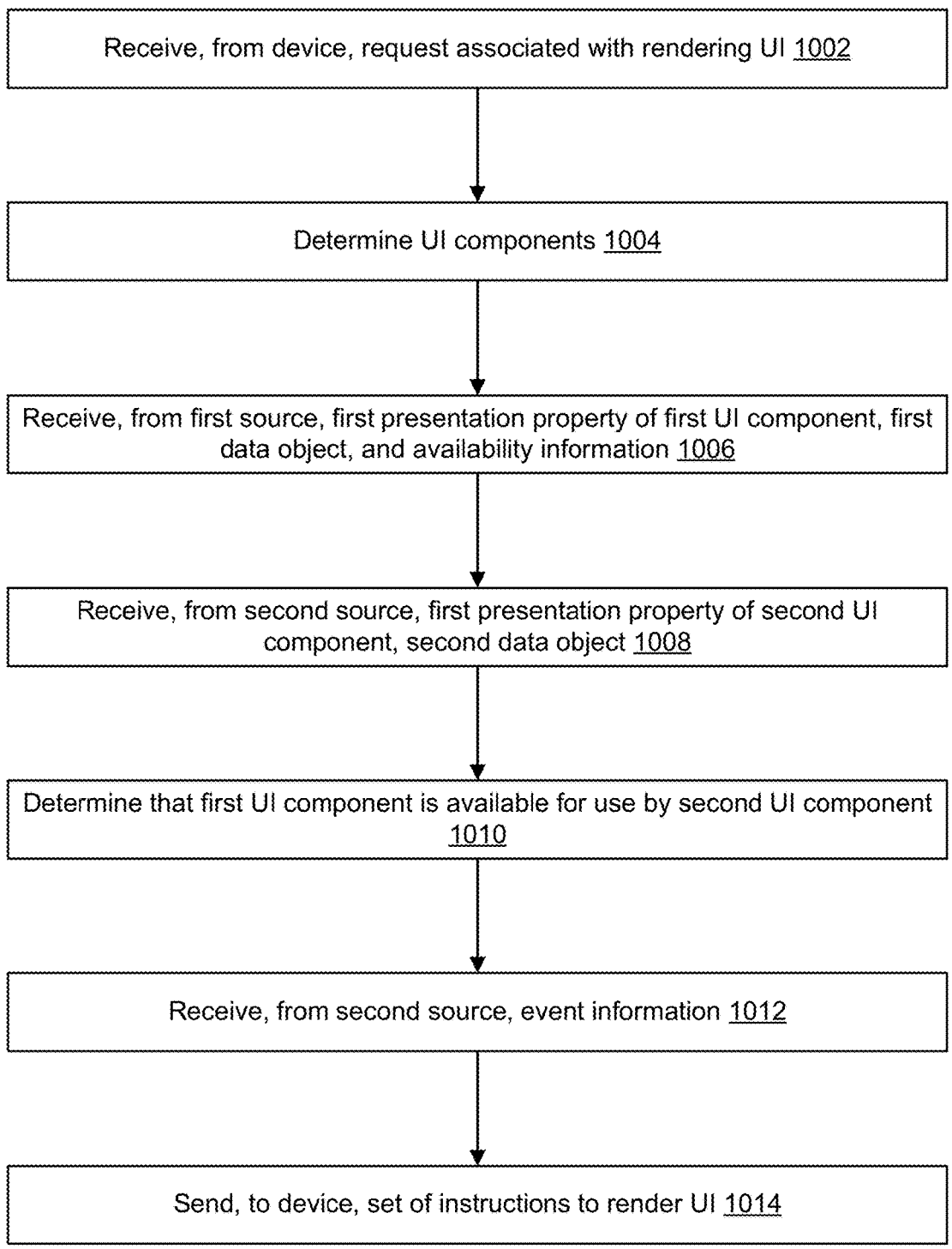
FIG. 10 illustrates an example of a flow for a server-based UI rendering, according to at least one embodiment.

FIG. 10 illustrates an example of a flow 1000 for a server-based UI rendering, according to at least one embodiment. The flow 1000 may start at operation 1002, where the computer system receives, from a device (e.g., the computing device 120 of FIG. 1), a request associated with rendering a UI. The request can include, among other things, identifiers of UI components of the UI (e.g., the UI components to be rendered), lineage information about the UI components, information about data objects stored locally at the device (e.g., cached data objects), and contextual data. If the request is an initial request to render the UI, the lineage information can indicate, among other things, a root node UI component (e.g. the UI itself) and may exclude information about other UI components. In this case, the computer system may use the indication to determine pre-stored lineage information associated with the root node UI component and describing the associations (e.g., ancestor and descendant associations) between the UI components of the UI. If the request is a subsequent request (e.g., a refresh request), the lineage information includes in the request can itself indicate the associations.

The flow 1000 may also include operation 1004, where the computer system determines the UI components that are to be rendered. For example, the computer system identifies these components from the request. Additionally, the computer system can determine the associations between the UI components, such as their lineage. For instance, the computer system determines that a first UI component of the UI is a parent of a second UI component of the UI.

The flow 1000 may also include operation 1006, where the computer system receives, from a first source, a first presentation property of the first UI component, a first data object indicating first content to be presented in the first UI component, and an availability information indicating that the first UI component is available for use by other UI components. The first source can be responsible for configuring the first UI component, whereby the computer system can request a resolution of the UI component and receives a response back from this source. The availability information corresponds to an available event that the first UI component supports.

The flow 1000 may also include operation 1008, where the computer system receives, from a second source, a second presentation property of the second UI component and a second data object indicating second content to be presented in the second UI component. Here, if the second UI component supports a second available event, the relevant availability information can also be received from the second source. The second source can be responsible for configuring the second UI component. Although the flow 1000 illustrates the resolution of two UI components, similar operations can be performed to resolve an additional number of UI components, some of which are identified in the request of the client, and other ones may be identified in responses of one or more sources.

The flow 1000 may also include operation 1010, where the computer system determines that the first UI component is available for use by the second UI component. For example, the computer system relies on a set of rules specifying that an available event of a UI component is applicable to descendants of the UI component. Based on the associations between the UI components, the computer determines that the first UI component is the parent of the second UI component. Accordingly, the computer system determines that the available event of the first UI component is applicable to the second UI component. As described herein above, the applicability of the available event can be propagated to other UI components based on the lineage information (e.g., using a bubbling up mechanism), whereby each or some of the sources of the UI components can indicate the applicability in their responses.

The flow 1000 may also include operation 1012, where the computer system receives, from the second source, event information. In an example, because the available event applies to the second UI component, the computer system can send an event resolution request to the second source. In turn, the second source can send an event resolution response indicating a type of event action, an event topic, one or more event triggers, and a payload. Although the flow 1000 illustrates the resolution of a single event, similar operations can be performed to resolve an additional number of events, some of which are associated with a same available event, and other ones are associated with different available events.

The flow 1000 may also include operation 1014, where the computer system sends to the device a set of instructions to render the UI (or the resolved UI components). In an example, the set of instructions include rendering instructions that indicate the first presentation property, the second presentation property, the first data object, the second data object, and the event information. In case other UI components and/or events were resolved, the rendering instructions can further include the relevant presentation properties, data objects, and event information.

Figure 11:
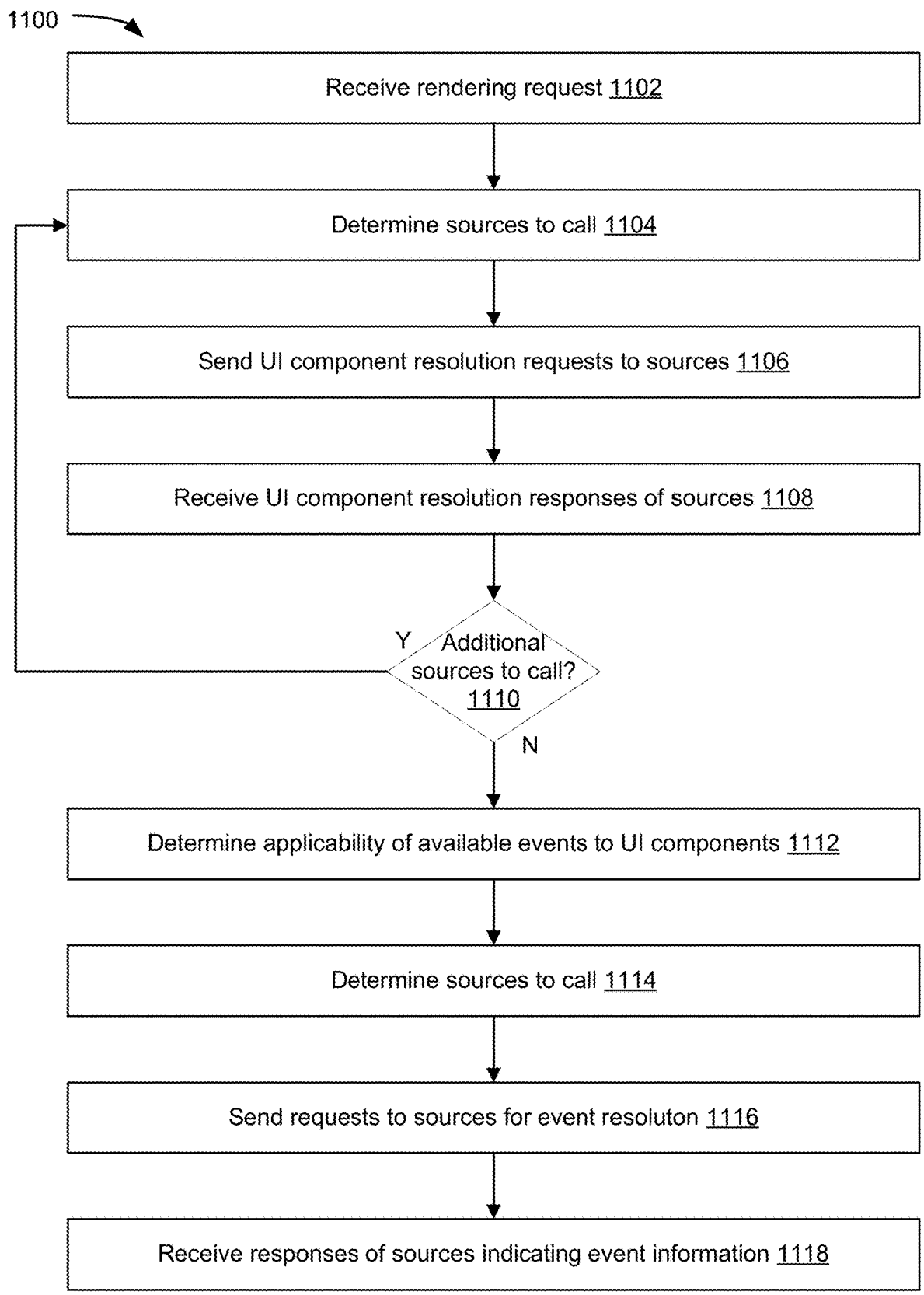
FIG. 11 illustrates an example of a flow for determining UI component configurations, data objects, and event information, according to at least one embodiment.

FIG. 11 illustrates an example of a flow 1100 for determining UI component configurations, data objects, and event information, according to at least one embodiment. Operations of the flow 1100 can be performed as sub-operations of the flow 1000 by an orchestrator of the computer system. The flow 1100 may start at operation 1102, where the orchestrator can receive a rendering request sent by the device.

The flow 1100 may also include operation 1104, where the orchestrator determines sources to call. For example, the orchestrator determines identifiers of UI components from the rendering request and send such identifiers to a router (e.g., via an API call) that returns identifiers of the sources responsible for configuring the UI components.

The flow 1100 may also include operation 1106, where the orchestrator sends UI component resolution request to the sources. For example, an API call is made to each determined source. The API call may identify the UI component to be resolved, contextual information, among other information.

The flow 1100 may also include operation 1108, where the orchestrator receives UI component resolution responses of the sources. For example, each source returns UI component resolution for the corresponding UI component. A UI component resolution can indicate one or more presentation properties of a UI component, one or more data objects to bind to the UI component, availability information (as applicable), and one or more identifiers of one or more UI components to additionally resolve (as applicable).

The flow 1100 may also include operation 1110, where the orchestrator determines whether additional sources are to be called. If so, the flow 1100 loops back to operation 1104. Otherwise, the flow 1100 proceeds to operation 1112. In an example, if a UI component resolution response identifies an additional UI component to resolve, the orchestrator can request the router to identify the corresponding source and, upon determining this source, can request the source to resolve the additional UI component.

The flow 1100 may also include operation 1112, where the orchestrator determines applicability of available events to UI components. In an example, the UI component resolution responses indicate the available events. A bubbling up mechanism can be implemented to determine whether an available event is to be bubbled up or not. Per this mechanism, a source responsible for configuring a UI component can indicate (e.g., using a set of flags in a response to an API call) whether an available event is to be applied to the UI component and if so whether the bubbling up should be stopped. If the applicability is unknown and/or the bubbling up is not stopped, the available event can be bubbled up to the next ancestor UI component (as indicated by the linear information). A set of rules can also be used to determine final applicability, where, for instance, applicability of multiple available events to a component is permitted if the available events are associated with different event action types and is denied otherwise. If denied, the set of rules can specify that the available event having the lowest bubbling up hierarchical level applies.

The flow 1100 may also include operation 1114, where the orchestrator determines sources to call for event resolutions. In an example, the orchestrator has determined than an available event applies to a UI component. Accordingly, the orchestrator can request the router to identify the corresponding source and, upon determining this source, can request the source to resolve the event. This source determination can be repeated for the different UI components to which available events are determined to apply.

The flow 1100 may also include operation 1116, where the orchestrator sends request to the sources determined at operation 1114 to return event resolutions. A request sent to a source responsible for configuring a UI component can indicate the UI component and an available event applicable to the UI component.

The flow 1100 may also include operation 1118, where the orchestrator receives responses of the sources indicating event information. For example, a source responsible for configuring a UI component to which an available event applies sends an event resolution response. This response includes event information such as the event action type, event topic, event trigger(s), and payload.

Figure 12:
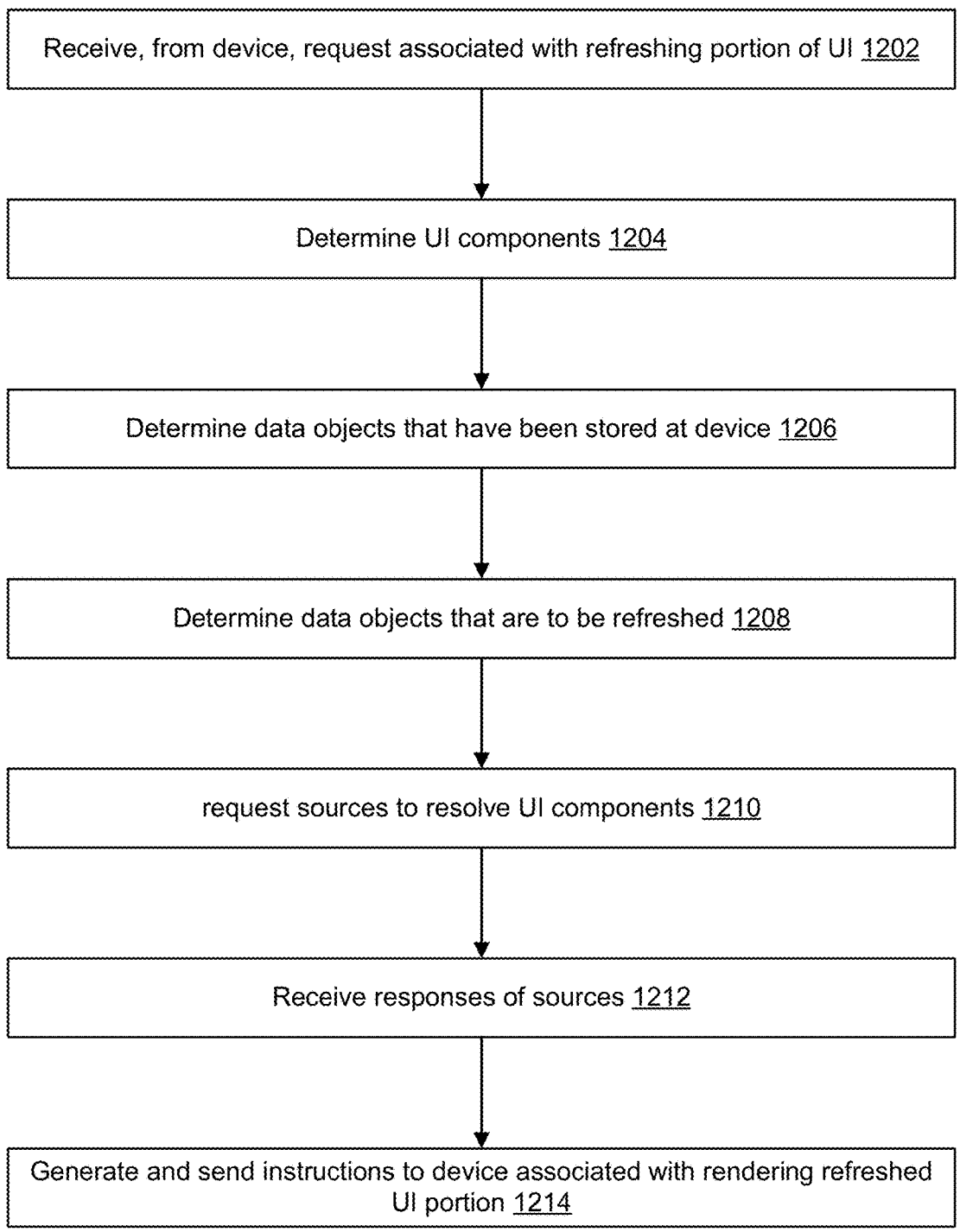
FIG. 12 illustrates an example of a flow for refreshing a portion of a UI, according to at least one embodiment.

FIG. 12 illustrates an example of a flow 1200 for refreshing a portion of a UI, according to at least one embodiment. Operations of the flow 1200 can be performed as sub-operations of the flow 1000. In particular, rendering instructions may have been sent to the computing device in response to a first rendering request. A subsequent, second rendering request is received and can indicate a portion of the UI to be refreshed. In this case, rather than having to resolve the entire UI, the computer system can resolve the portion to be refreshed.

The flow 1200 may start at operation 1202, where the computer system receives, from the device, a request associated with refreshing a portion of the UI. In an example, the request can indicate the UI component to be refreshed. Refreshing can include updating content presentable in the UI components and/or presenting content in a UI component that is to be added to a viewed portion of the UI.

The flow 1200 may also include operation 1204, where the computer system determines the UI components to be refreshed. For example, the computer system identifies these components from the request. In addition, and as explained herein above in connection with the flow 1100, the computer system (e.g., the orchestrator) can determine sources responsible for configuring the UI components.

The flow 1200 may also include operation 1206, where the computer system determines data objects that have been stored at the device. For example, the request also includes cache filter information indicating the data objects previously cached at the device. The computer system identifies the data objects based on the cache filter information.

The flow 1200 may also include operation 1208, where the computer system determines data objects that are to be refreshed. In an example, a UI component identified in the request is associated with a data object. Accordingly, the computer system determines that this data object is to be refreshed. In an example, a cached data object may have an expiration date (or some other property) indicating that the cached data object has expired and needs to be replaced. Based on the expiration date (or the other property), the computer system determines that this data object is to be refreshed. In both example, each data object to be refreshed is associated with a UI component. The sources corresponding to the UI component can be determined.

The flow 1200 may also include operation 1210, where the computer system request sources to resolve UI components associated with the refresh. As explained in connection with operation 1204, a UI component is indicated as needing a refresh. As also explained in connection with operation 1208, a data object is determined as needing a refresh and this data object is associated with a UI component. In both cases, the corresponding source(s) are determined (e.g., by the orchestrator according to a request to the router) and requested to resolve the UI component(s) (e.g., by the orchestrator according to a request(s) to the source(s)).

The flow 1200 may also include operation 1212, where the computer system receives the response of the source(s). For example, resolution response is returned indicating an updated UI component (e.g., updated presentation properties), an updated data object, updated availably information (as applicable), and/or updated event information (as applicable).

The flow 1200 may also include operation 1214, where the computer system generates and sends instructions to the device associated with rendering the refreshed portion of the UI. For example, the instructions can include presentation properties of the updated UI components, data objects to use, and updated event information as applicable.

In certain situations, when a source initially resolves a UI component and/or an event for the UI component, the source can indicate one or more data objects to use depending on the actual event. This resolution-dependency can be indicated to the orchestrator. In turn, the orchestrator can generate configuration information reflecting the dependency and can send the data object(s) and the configuration information to the device. The rendering instructions can request the device to include the configuration information in a subsequent rendering request such that, when the computer system can determine that the UI component can be resolved by re-using the relevant cached data object and without the need to call the source again. Such approach can reduce the UI rendering latency and referred to herein as edge-caching.

To illustrate, consider an example of a detailed page as a UI component available for presenting detailed information about movie titles. Depending on a movie title and/or contextual information about a user account, the detailed page can show a number of options for playing the movie title. For instance, for "ACME Movie 123," the detailed page can show a first option to rent the movie title from a first service provider and a second option to rent the movie title from a second service provider. In comparison, for "ACME Movie 456," the detailed page can show the first option, but not the second option. Accordingly, when a first tile corresponding to "ACME movie 123" is selected, the detailed page is rendered showing both options. When a second tile corresponding to "ACME movie 456" is selected, the detailed page is rendered showing the first option only. To enable such functionality of the detailed page UI component, the corresponding source can return a first data object for the first option and a second data object for the second option. This source can also indicate that the two data objects are to be used with an event indicating the selection of the first tile and that the first data object is to be used with an event indicating the selection of the second tile. In this case, the computer system can cache both data objects at the device along with configuration information indicating their use. Upon a request to render the detailed page UI component following the selection of the first tile, the device can also send the configuration information. Given this configuration information, the computer system determines that both data objects are to be used. In this case, rather than having to call the data source to determine the data objects, the computer system instructs the device to render the detailed page using both data objects. In comparison, upon a request to render the detailed page UI component following the selection of the first tile, the computer system determines that the first data object is to be used and instructs the device to do so.

Figure 13:
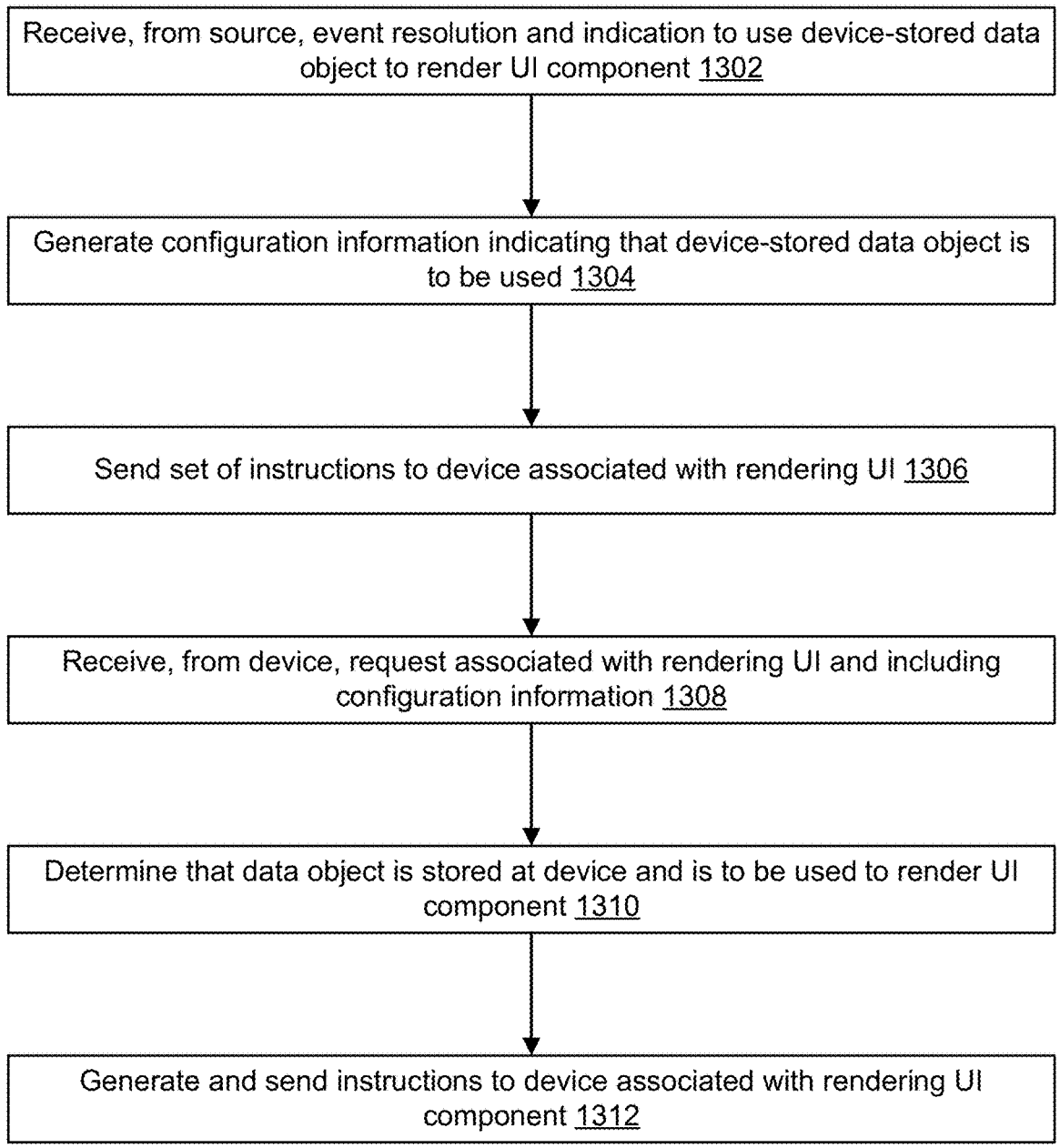
FIG. 13 illustrates an example of a flow for using data objects stored at a device to generate UI rendering instructions, according to at least one embodiment.

FIG. 13 illustrates an example of a flow 1300 for using data objects stored at a device to generate UI rendering instructions, according to at least one embodiment. The flow 1300 can be implemented to support the above edge-caching functionality. Further, operations of the flow 1300 can be performed as sub-operations of the flow 1000.

The flow 1300 may start at operation 1302, where the orchestrator receives, from a source, a resolution of a UI component and/or of an event that can be triggered at the UI component and an indication to use device-stored data object (e.g., the one corresponding to the first option described in the above illustrative example) to render the UI component (e.g., the detailed UI component described in the above illustrative example). For example, the resolution can be for an event action to be performed at the UI component by using the data object.

The flow 1300 may also include operation 1304, where the orchestrator generates configuration information indicating the device-stored data object is to be used. In an example this information can indicate the UI component, the data object, and, in the case of an event, the event action.

The flow 1300 may also include operation 1306, where the orchestrator sends instructions to the device associated with rendering the UI. The instructions can include the data object and the configuration information.

The flow 1300 may also include operation 1308, where the orchestrator receives, from the device, a request associated with rendering the UI (or a portion thereof) and including the configuration information. For example, this request can indicate that the UI component is to be rendered in response to an event trigger or for a refresh.

The flow 1300 may also include operation 1310, where the orchestrator determines that the data object is stored at the device and is to be used to render the UI component. For example, the request includes the cache filter information, thereby allowing the computer system to determine that the data object is already stored at the device. Given the configuration information, the computer system determines that this already stored data object can be re-used.

The flow 1300 may also include operation 1312, where the orchestrator generates and sends instructions to the device associated with rendering the UI component. For example, the computer system instructs the device to render the UI component by using the cached data object.

Figure 14:
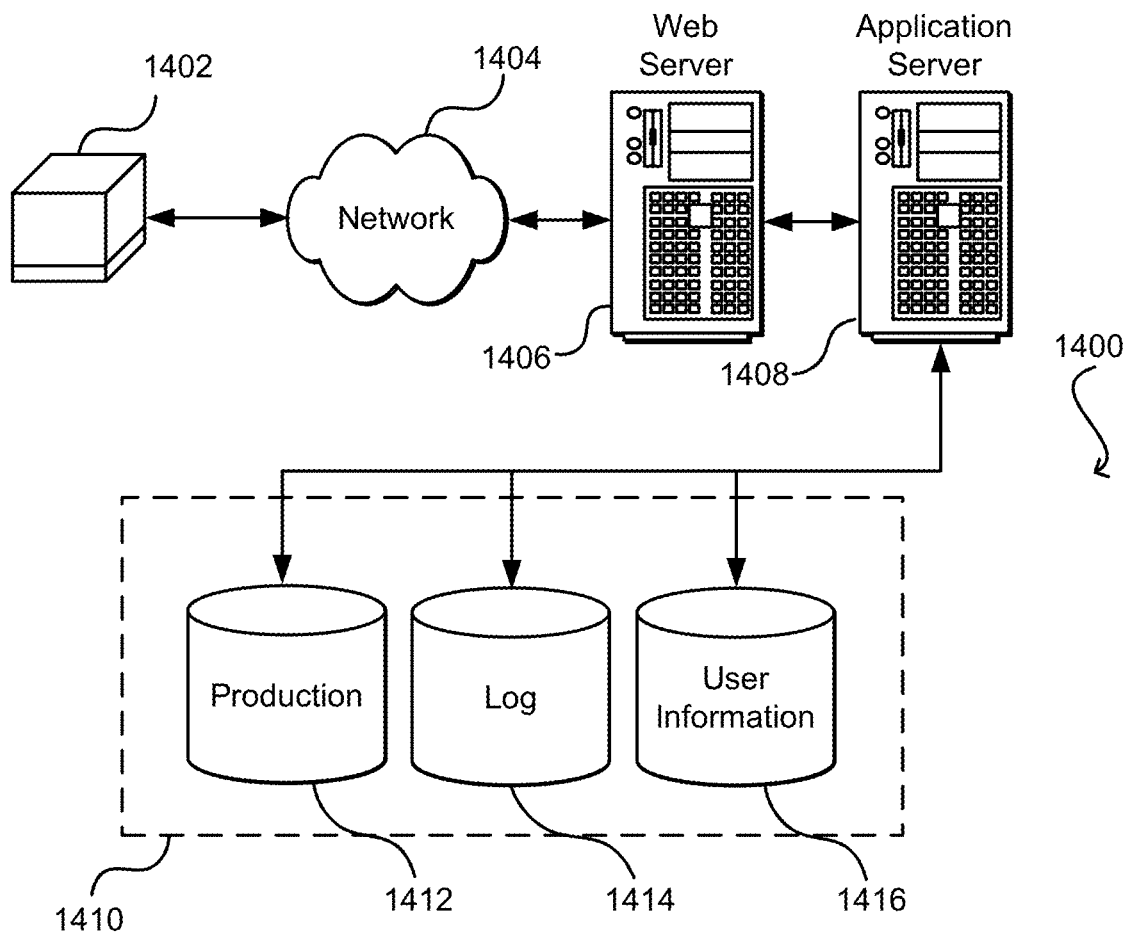
FIG. 14 illustrates an environment in which various embodiments can be implemented.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402 (e.g., an example of the computing device 120), which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 (e.g., an example of the computer system 110) and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HTML, Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above.

For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media storing instructions that, upon execution on a system, cause the system to perform operations comprising:
   receiving, from a device, a request associated with rendering a user interface (UI) on the device, the request comprising references to UI components of the UI;
   determining that lineage information included in the request or stored by the system indicate that a first UI component of the UI is a parent of a second UI component of the UI;
   receiving, from a first source associated with the first UI component, a first presentation property of the first UI component, a first data object indicating first content presentable in the first UI component, and availability information indicating that the first UI component is available for use by other UI components;
   receiving, from a second source associated with the second UI component, a second presentation property of the second UI component and a second data object indicating second content presentable in the second UI component;
   determining, based at least in part on the first UI component being the parent of the second UI component, that the first UI component is available for use by the second UI component, the use including presentation of third content in the first UI component instead of in the second UI component, the third content associated with the second UI component;
   receiving, from the second source, event information indicating the third content presentable and an event trigger at the second UI component to present the third content in the first UI component while the second content is presented in the second UI component; and
   sending, to the device, a set of instructions associated with the rendering of the UI, the set of instructions comprising the first presentation property, the first data object, the second presentation property, the second data object, and the event information.

2. The one or more non-transitory computer-readable storage media of claim 1 further storing additional instructions that, upon execution on the system, cause the system to perform operations comprising:
   determining that the references are associated with a first portion of the UI and that the request indicates a third data object that the device has cached, wherein the first portion comprises the first UI component and the second UI component;
   determining that the third data object is associated with a third UI component from a second portion of the UI;
   determining that the third data object and a third presentation property of the third UI component are to be excluded from the set of instructions; and
   selecting the first data object and the second data object to include in the set of instructions.

3. The one or more non-transitory computer-readable storage media of claim 1, wherein the request is a first request, and wherein the one or more non-transitory computer-readable storage media store additional instructions that, upon execution on the system, cause the system to perform further operations comprising:
   receiving, from the device, another request associated with rendering at least a third UI component;
   determining that the other request indicates a third data object that the device has cached and configuration information to use the third data object in association with rendering the third UI component;
   determining a third presentation property of the third UI component; and
   including, in the set of instructions, the third presentation property and an identifier of the third data object.

4. A computer-implemented method comprising:
   receiving, from a device, a request associated with rendering a user interface (UI) on the device, the UI comprising a first UI component and a second UI component;
   receiving, from a first source associated with the first UI component, availability information indicating that the first UI component is available for use by other UI components;
   determining, based at least in part on the availability information, that the first UI component is available for use by the second UI component, the use including presentation of content in the first UI component instead of in the second UI component, the content associated with the second UI component;
   receiving, from a second source associated with the second UI component, event information indicating the content and an event trigger at the second UI component to present the content in the first UI component while different content is presented in the second UI component; and
   sending, to the device, a set of instructions associated with the rendering of the UI, the set of instructions comprising the event information.

5. The computer-implemented method of claim 4, wherein the content is third content, and wherein the computer-implemented method further comprises:
   determining, based at least in part on the request, references to UI components of the UI and lineage of the UI components;
   determining, based on the lineage, that the first UI component is a parent of the second UI component;

receiving, from the first source, a first presentation property of the first UI component, a first data object indicating first content presentable in the first UI component;

receiving, from the second source, a second presentation property of the second UI component and a second data object indicating second content presentable in the second UI component;

requesting, from the second source and based at least in part on the first UI component being the parent of the second UI component, the event information; and including, in the set of instructions, the first presentation property, the first data object, the second presentation property, and the second data object.

6. The computer-implemented method of claim 4, further comprising:

determining that a third UI component of the UI is available for use by the second UI component, wherein availabilities of the first UI component and the third UI component are for a same type of event actions;

determining that the first UI component is a descendant of the third UI component; and selecting the first UI component instead of the third UI component for use by the second UI component based at least in part on the first UI component being the descendant.

7. The computer-implemented method of claim 4, wherein the event information, the content, and the event trigger are first event information, first content, and a first event trigger, respectively, and wherein the computer-implemented method further comprises:

determining that a third UI component of the UI is available for use by the second UI component, wherein availabilities of the first UI component and the third UI component are for different types of event actions;

requesting, from a third source associated with the third UI component, second event information;

receiving, from the third source, the second event information indicating second content presentable in the third UI component and a second event trigger at the second UI component to present the second content; and including, in the set of instructions, the second event information.

8. The computer-implemented method of claim 4, wherein the event information, the content, and the event trigger are first event information, first content, and a first event trigger, respectively, and wherein the computer-implemented method further comprises:

determining that a third UI component of the UI is available for use subsequent to use of the first UI component by the second UI component;

requesting, from a third source associated with the third UI component, second event information;

receiving, from the third source, the first event information indicating second content presentable in the third UI component and a second event trigger associated with the use of the third UI component, wherein the first event information further comprises the second event trigger; and including, in the set of instructions, the second event information.

9. The computer-implemented method of claim 4, further comprising:

determining that a third data object associated with a third UI component of the UI is to be stored at the device;

generating configuration information indicating that the third data object is to be used in association with configuring the third UI component; and including, in the set of instructions, the third data object and the configuration information.

10. The computer-implemented method of claim 9, wherein the request and the set of instructions are a first request and a first set of instructions, respectively, and wherein the computer-implemented method further comprises:

receiving, from the device, a second request associated with rendering the third UI component, the second request comprising the configuration information and indicating that the third data object is stored at the device;

determining a presentation property of the third UI component; and sending, to the device, a second set of instructions associated with rendering the third UI component, the second set of instructions comprising the presentation property and an identifier of the third data object.

11. The computer-implemented method of claim 4, wherein the request and the set of instructions are a first request and a first set of instructions, respectively, and wherein the computer-implemented method further comprises:

receiving, from the device, a second request associated with refreshing the second UI component, the second request indicating that a first data object corresponding to the first UI component and a second data object corresponding to the second UI component are stored at the device;

determining a third data object to replace the second data object;

including the third data object in a second set of instructions;

determining that the first data object is to be excluded from the second set of instructions; and sending the second set of instructions to the device.

12. The computer-implemented method of claim 11, further comprising:

determining that the first request comprises a first identifier of the first data object, a second identifier of the second data object, and a third identifier of the second UI component;

determining that the first data object and the second data object are stored at the device based at least in part on the first identifier and the second identifier;

determining that a refresh of the second UI component is requested based at least in part on the third identifier;

selecting the second data object instead of the first data object to be replaced with the third data object based at least in part on the refresh; and requesting the third data object from the second source.

13. A system, comprising:

one or more processors; and one or more memory storing computer-readable instructions that, upon execution by the one or more processors, configure the system to:

receive, from a device, a request associated with rendering a user interface (UI) on the device, the UI comprising a first UI component and a second UI component;

receive, from a first source associated with the first UI component, availability information indicating that the first UI component is available for use by other UI components;

determine, based at least in part on the availability information, that the first UI component is available for use by the second UI component, the use including presentation of content in the first UI component instead of in the second UI component, the content associated with the second UI component;

receive, from a second source associated with the second UI component, event information indicating the content and an event trigger at the second UI component to present the content in the first UI component while different content is presented in the second UI component; and send, to the device, a set of instructions associated with the rendering of the UI, the set of instructions comprising the event information.

14. The system of claim 13, wherein the request comprises a first identifier of the first UI component, and wherein the one or more memory further store additional computer-readable instructions that, upon execution by the one or more processors, configure the system to:

determine the first source based at least in part on the first identifier;

request a configuration of the first UI component from the first source;

receive, from the first source, configuration information comprising a presentation property of the first UI component, a data object, and the availability information; and include, in the set of instructions, the presentation property and the data object.

15. The system of claim 13, wherein the request indicates lineage of UI components of the UI, and wherein the one or more memory further store additional computer-readable instructions that, upon execution by the one or more processors, configure the system to:

determine, based at least in part on the lineage, that the first UI component is a parent of the second UI component;

receive, from the first source, an indication that the availability information is applicable to a set of descendants of the first UI component and is inapplicable to a set of ancestors of the first UI component; and store the indication, wherein the event information is requested from the second source based at least in part on the indication.

16. The system of claim 13, wherein the request indicates that a data object corresponding to the first UI component is stored at the device, and wherein the set of instructions excludes the data object.

17. The system of claim 13, wherein the request indicates that a first data object corresponding to the first UI component is stored at the device, and wherein the one or more memory further store additional computer-readable instructions that, upon execution by the one or more processors, configure the system to:

determine that the first data object has expired;

determine, from the first source, a second data object to replace the first data object; and include the second data object in the set of instructions.

18. The system of claim 13, wherein the request comprises a first identifier of the first UI component, and wherein the one or more memory further store additional computer-readable instructions that, upon execution by the one or more processors, configure the system to:

determine the first source based at least in part on the first identifier;

request a first configuration of the first UI component from the first source;

receive, from the first source, first configuration information comprising the availability information and a second identifier of a third UI component;

request a second configuration of the third UI component from a third source;

receive, from the third source, second configuration information comprising a presentation property of the third UI component and a second data object; and include, in the set of instructions, the presentation property and the second data object.

19. The system of claim 13, wherein the availability information comprises an identifier of the first UI component and a type of event action that the first UI component supports.

20. The system of claim 13, wherein the event information comprises an identifier of the first UI component, a type of event action, the event trigger, and a payload indicating the content.

* * * * *